United States Patent
Jia et al.

(10) Patent No.: US 7,593,465 B2
(45) Date of Patent: Sep. 22, 2009

(54) METHOD FOR VIDEO CODING ARTIFACTS CONCEALMENT

(75) Inventors: Yunwei Jia, Milton (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1104 days.

(21) Appl. No.: 10/950,703

(22) Filed: Sep. 27, 2004

(65) Prior Publication Data

US 2006/0072660 A1 Apr. 6, 2006

(51) Int. Cl.
*H04N 7/12* (2006.01)
*H04N 5/217* (2006.01)
(52) U.S. Cl. ............... 375/240.25; 348/241; 375/240.27
(58) Field of Classification Search ............ 375/240.25, 375/240.2, 240.03; 348/241, 624; 382/260; 250/208.1; 258/426.12
See application file for complete search history.

(56) References Cited

U.S. PATENT DOCUMENTS

| | | | | |
|---|---|---|---|---|
| 5,917,609 A | * | 6/1999 | Breeuwer et al. | 358/426.12 |
| 6,498,815 B2 | * | 12/2002 | Kleihorst et al. | 375/240.2 |
| 6,828,540 B2 | * | 12/2004 | Landolt | 250/208.1 |
| 7,065,255 B2 | * | 6/2006 | Chen et al. | 382/260 |
| 7,301,999 B2 | * | 11/2007 | Filippini et al. | 375/240.03 |
| 7,450,181 B2 | * | 11/2008 | Daly | 348/624 |
| 2005/0030393 A1 | * | 2/2005 | Tull | 348/241 |

* cited by examiner

*Primary Examiner*—Gims S Philippe
(74) *Attorney, Agent, or Firm*—Christopher P. Maiorana, P.C.

(57) ABSTRACT

A method and circuit for processing a reconstructed picture generated from compressed data is disclosed. The method generally includes the steps of (A) estimating a magnitude of coding artifacts created by a coding process for the compressed data based upon the compressed data, (B) generating a plurality of noise samples with a probability distribution over a range, the probability distribution determined by the magnitude and (C) adding the noise samples to the reconstructed picture for concealment of the coding artifacts.

26 Claims, 7 Drawing Sheets

| QUANTIZER_SCALE_CODE | QUANTIZER_SCALE[Q_SCALE_TYPE] | |
|---|---|---|
| | Q_SCALE_TYPE = 0 | Q_SCALE_TYPE = 1 |
| 0 | (FORBIDDEN) | |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

FIG. 6

NOISE SAMPLES

METHOD FOR VIDEO CODING ARTIFACTS CONCEALMENT

FIELD OF THE INVENTION

The present invention relates to video decompression generally and, more particularly, to a method for video coding artifact concealment.

BACKGROUND OF THE INVENTION

Digital video compressed by most video coding standards, such as MPEG-1, MPEG-2/H.262, H.263, MPEG-4, and MPEG-4 AVC/H.264, suffers from visually disturbing coding artifacts, including blocking artifacts, ringing artifacts, and mosquito artifacts. The coding artifacts are especially noticeable at low bit rate video. Reducing the coding artifacts in decoded video is highly desirable prior to displaying. A method to achieve an artifact reduction goal should be effective in reducing the coding artifacts, not introduce new objectionable artifacts and be easily implemented in terms of storage capacity, memory bandwidth and computational complexity.

Three approaches to reducing coding artifacts currently exist: spatial filtering, temporal filtering and random noise addition. The spatial filtering approach tries to detect spatial discontinuities in a decoded picture and smooth the discontinuities by spatial filtering. The temporal filtering approach performs temporal filtering along a motion trajectory of an object. The random noise addition approach adds random noise into a decoded picture for the purpose of hiding coding artifacts.

A known problem of the spatial filtering approach is distinguishing discontinuities generated from coding (i.e., coding artifacts) and real edges in a decoded picture. Edge distinguishing has been proven to be very difficult, and in some cases, even impossible. As a result, either not enough coding artifacts are reduced, or new "filtering" artifacts are introduced that are sometimes even more disturbing than the original coding artifacts. Also, the spatial filtering approach is not effective in reducing mosquito artifacts.

In the temporal filtering approach, true motion vectors are needed in order to effectively remove the coding artifacts along the motion trajectory of an object. However, true motion vectors are often not available. In particular, the motion vectors used in coding may not necessarily represent the true motions of objects. Using incorrect motion vectors in temporal filtering can result in disturbing distortion of a picture. Also, the temporal filtering approach is not effective in reducing blocking artifact and ringing artifact. Furthermore, both the spatial filtering approach and the temporal filtering approach normally have high computational complexity.

The approach of adding random noise into a decoded picture is based on an observation that coding artifacts are disturbing to human visual system because the artifacts all have certain patterns that are either spatial or temporal. Adding random noise into a decoded picture can break the visual patterns and thus make the coding artifacts less noticeable. The random noise approach has been shown to be effective in reducing all types of coding artifacts. What has not been found, however, is a method of adding random noise that utilizes a small amount of storage, allows efficient memory access, has low computational complexity, is effective in reducing coding artifacts and does not introduce new objectionable artifacts.

SUMMARY OF THE INVENTION

The present invention concerns a method and circuit for processing a reconstructed picture generated from compressed data. The method generally comprises the steps of (A) estimating a magnitude of coding artifacts created by a coding process for the compressed data based upon the compressed data, (B) generating a plurality of noise samples with a probability distribution over a range, the probability distribution determined by the magnitude and (C) adding the noise samples to the reconstructed picture for concealment of the coding artifacts.

The objects, features and advantages of the present invention include providing a system and method for video coding artifact concealment that may (i) effectively reduce coding artifacts, (ii) not introduce objectionable new artifacts, (iii) utilize a small amount of storage, (iv) allow efficient memory access and/or (v) have low computational complexity.

BRIEF DESCRIPTION OF THE DRAWINGS

These and other objects, features and advantages of the present invention will be apparent from the following detailed description and the appended claims and drawings in which:

FIG. 6 is a table illustrating a relationship between two variables used for comfort noise addition;

FIG. 8 is an example set of noise samples.

DETAILED DESCRIPTION OF THE PREFERRED EMBODIMENTS

Figure 1:
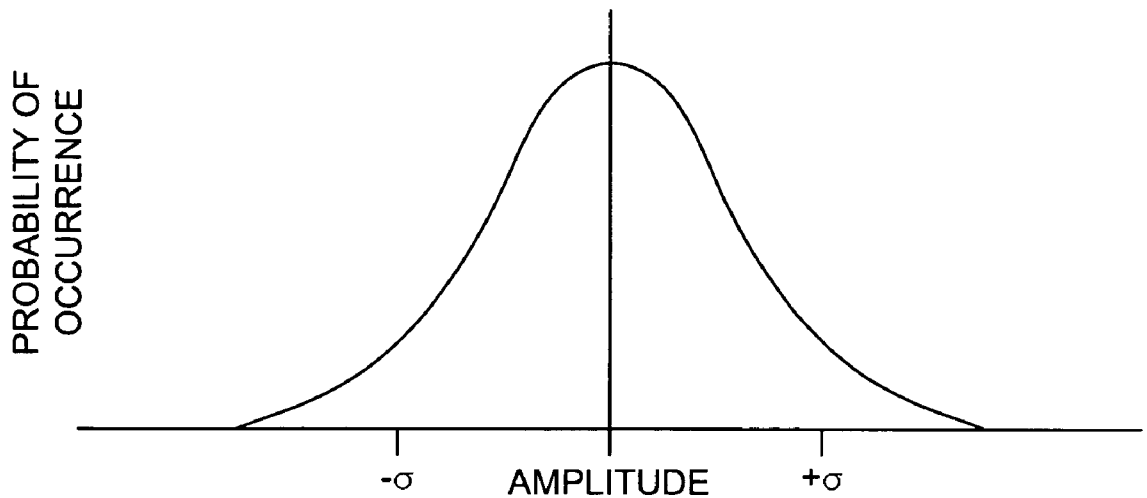
FIG. 1 is a diagram of an example Gaussian distribution of noise samples.
Figure 2:
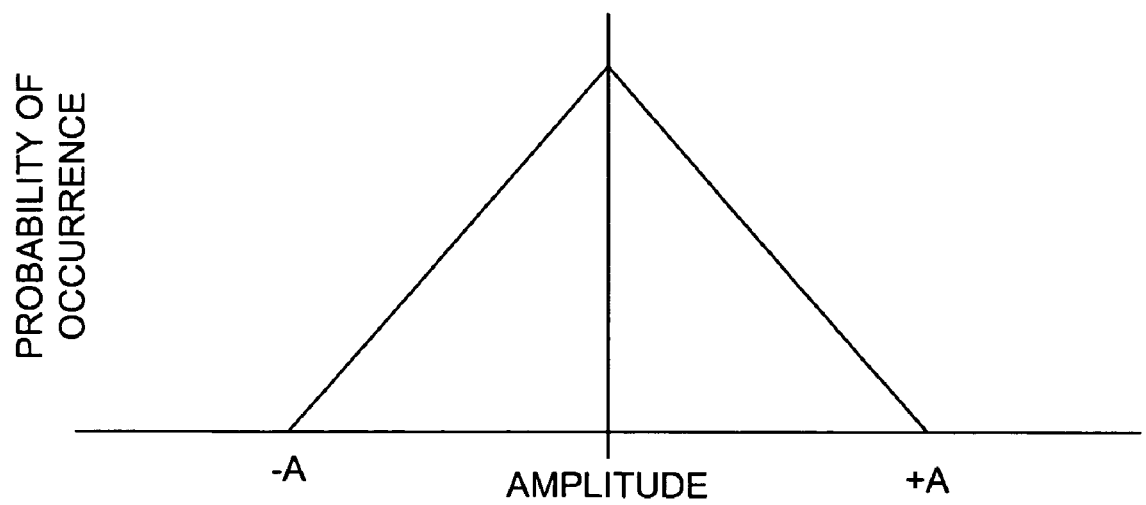
FIG. 2 is a diagram of an example triangular distribution of noise samples.

The present invention generally implements an approach of adding random noise into a decoded picture to conceal coding artifacts. The approach may consists of multiple steps. The steps may include pre-generating K random noise samples according to a specific probability distribution. Two example distributions may include (i) a Gaussian distribution (FIG. 1) with a zero mean and a standard deviation a and (ii) a triangular distribution (FIG. 2) between −A and +A, where A is a positive number. The randomly generated noise samples may be stored in a one-dimensional array (e.g., noise array G). For each block I in a decoded picture, a random number R may be generated. The random number R may be used as an offset in accessing the noise array G. Another step may include adding the noise samples starting from G[R] to the block I. The block I may define luminance values and/or chrominance values in the decoded picture. Note that the step of calculating the noise samples may be performed only once for the whole decoding process. Subsequent steps may be applied to each decoded block, row, column, field and/or frame of each picture.

Figure 3:
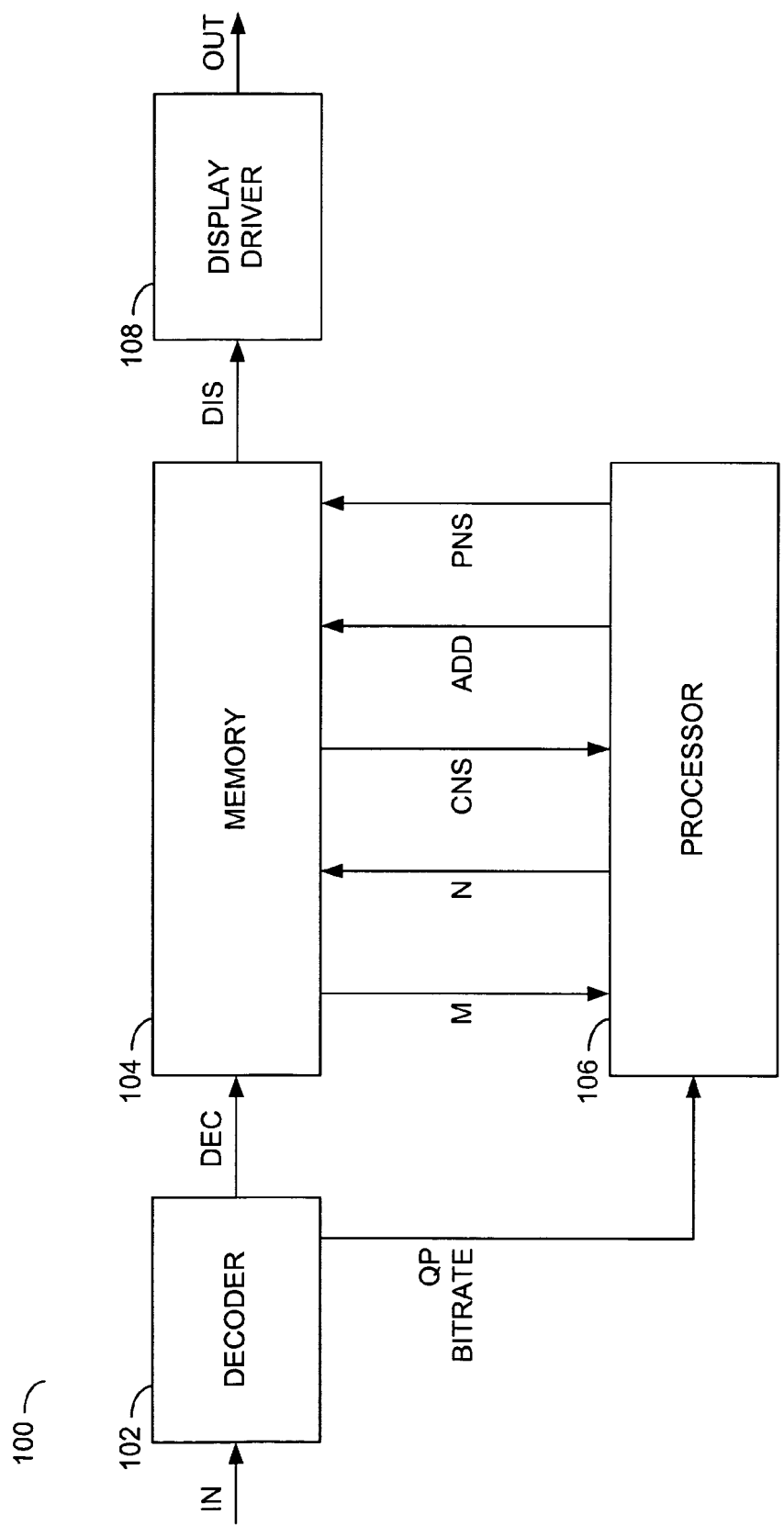
FIG. 3 is a block diagram of system in accordance with a preferred embodiment of the present invention.

Referring to FIG. 3, a block diagram of system 100 is shown in accordance with a preferred embodiment of the present invention. The system 100 generally comprises a decoder circuit (or module) 102, a memory circuit (or module) 104, a processor circuit (or module) 106 and a display driver circuit (or module) 108. An input signal (e.g., IN) may be received by the system 100. An output signal (e.g., OUT) may be presented by the system 100. The signal IN may be a bitstream carrying a compressed and/or encoded video sequence, data or a picture. The signal OUT may be generated in a format suitable for visual display.

The decoder circuit 102 may receive the bitstream IN. The decoder circuit 102 may be operational to decompress and/or decode the bitstream IN to generate a decompressed signal (e.g., DEC). The decoder circuit 102 may also be operational to extract characteristics of the bitstream IN that provide an indication and/or estimation of a magnitude of coding artifacts that may be present in the bitstream IN. For example, the characteristics may include a series of quantization parameters (e.g., QP) and/or a series of bit rate parameters (e.g., BITRATE) of the bitstream IN. Other characteristics may be obtained from the bitstream IN to meet the design criteria of a particular application.

The memory circuit 104 may receive the decompressed signal DEC. A signal (e.g., M) may be presented from the memory circuit 104 to the processor circuit 106. A signal (e.g., N) may be presented from the processor circuit 106 back to the memory circuit 104. A predetermined noise sample signal (e.g., PNS) may be received by the memory circuit 104 from the processor circuit 106. An address signal (e.g., ADD) may be received by the memory circuit 104 from the processor circuit 106. A comfort noise sample signal (e.g., CNS) may be presented from the memory circuit 104 back to the processor circuit 106. A display signal (e.g., DIS) may be presented from the memory circuit 104 to the display driver circuit 108.

The signal M may be a buffered version of the decompressed signal DEC. The signal N may be a comfort noise processed version of the signal M. The signal DIS may be a buffered version of the signal N. The signal PNS may carry K predetermined noise samples. The address signal ADD may carry a sequence of addresses used to both read and write the K noise samples. The signal CNS may carry the noise samples read at the addresses in the address signal ADD.

The memory circuit 104 may be operational to store a portion or all of the decompressed signal DEC. In general, the memory circuit 104 may buffer a sufficient amount of a picture or multiple pictures within the decompressed signal DEC to feed the processor circuit 106 in real time. For example, the memory circuit 104 may buffer a fraction of a picture field, an entire picture or frame, or multiple pictures in the signal DEC at a given time.

The memory circuit 104 may also be operational to store a portion or all of the signal N. In general, the memory circuit 104 may buffer a sufficient portion of the signal N to feed the display driver circuit 108 in real time. For example, the memory circuit 104 may buffer a fraction of a picture field, an entire picture or frame, or multiple pictures in the signal N at a given time.

The memory circuit 104 may be operational to store the K noise samples from the signal PNS. The noise samples may be arranged as a linear array addressable by the signal ADD. Each noise sample read from the linear array may be provided back to the processor circuit 106 in the signal CNS.

The processor circuit 106 may be operational to generate the noise samples used to condition the decompressed picture or pictures. The processor circuit 106 may also be operational to add the noise samples to the decompressed signal M to generate the decompressed signal N. The noise samples added to the signal N may be scaled based on one or more of the signals extracted from the signal IN, such as QP and/or BITRATE. Scaling may include unity scaling.

The display driver circuit 108 may be operational to read the video information from the signal N as buffered in the memory circuit 104. The signal OUT may be generated in an interlaced or a progressive format to meet the criteria of a particular application. In one implementation, the decode circuit 102, the memory circuit 104, the processor circuit 106 and the display driver circuit 108 may be fabricated on a single integrated circuit or chip. In another embodiment, the memory circuit 104 may be fabricated on a second integrated circuit or chip, separate from the first chip including the decoder circuit 102, the processor circuit 106 and the display driver circuit 108.

Figure 4:
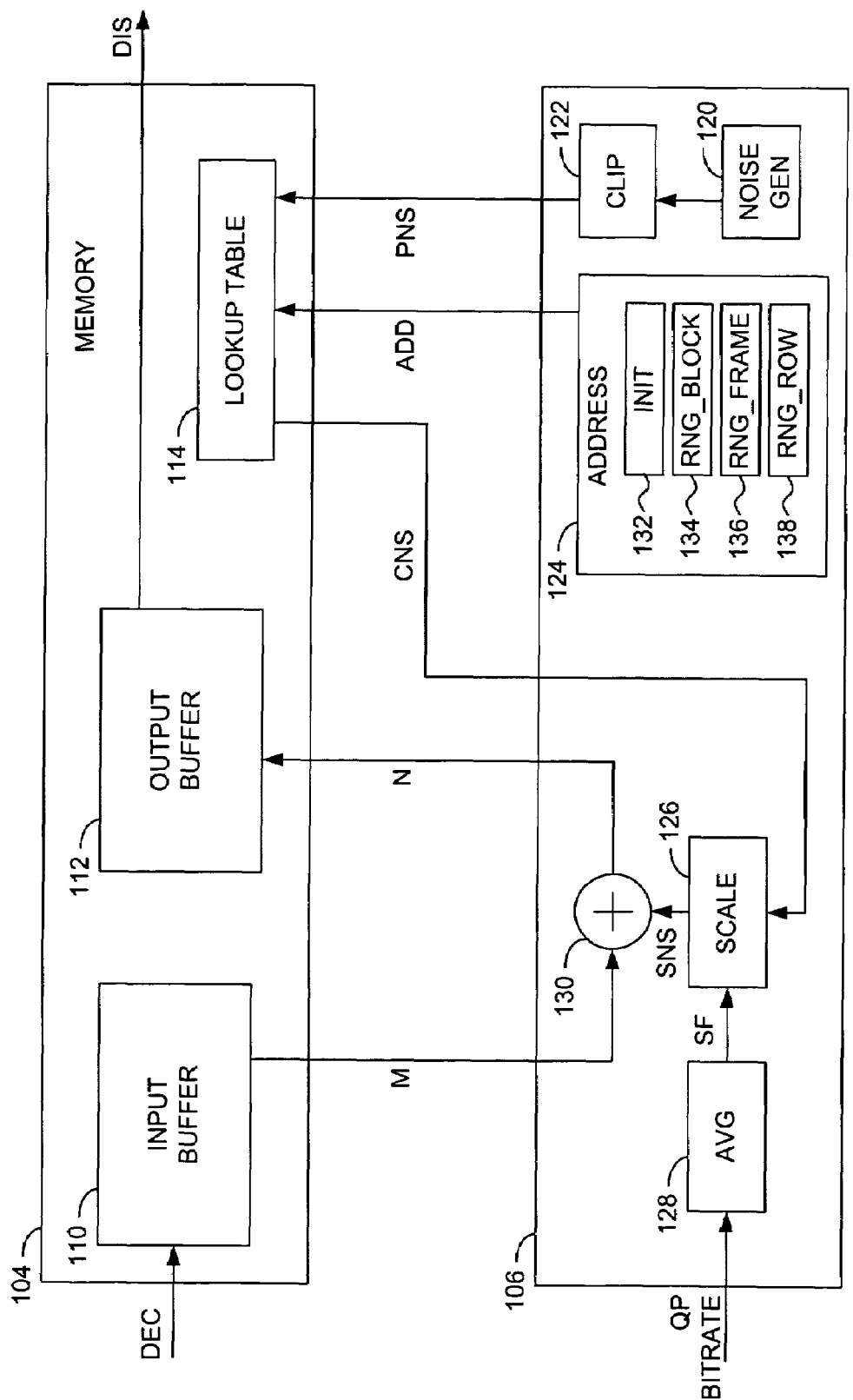
FIG. 4 is a detailed block diagram of an example implementation of a memory circuit and a processor circuit.

Referring to FIG. 4, a detailed block diagram of an example implementation of the memory circuit 104 and the processor circuit 106 is shown. The memory circuit 104 may be partitioned into an input buffer 110, an output buffer 112 and a lookup table 114. The input buffer 110 may buffer the decompressed signal DEC until read by the processor circuit 106 via the signal M. The output buffer 112 may buffer the comfort noise added signal N until read by the display driver circuit 108 via the signal DIS. The lookup table 114 may be partitioned to store the K noise samples. The lookup table 114 may be arranged as the linear array G. The linear array G may be accessible via the address signal ADD.

The processor circuit 106 may be operational to execute a software routine (or module) 120, an optional software routine (or module) 122, a software routine (or module) 124, an optional software routine (or module) 126, a software routine (or module) 128 and a software routine (or module) 130. Although functionality of the processor circuit 106 is generally described in terms of software routines, one of ordinary skill in the art would understand the software routines may be implemented as hardware modules to perform similar functions.

The software routine 120 may be operational to generate the K noise samples stored in the array G. The noise samples may be generated with a predetermined probability distribution over a range, or with a probability distribution over a range based on the one or more signals extracted from the signal IN. The software routine 122 may be optionally used to clip the noise samples into a predetermined range. The software routine 124 may be operational to generate the address signal ADD. The address signal ADD may be used during an initialization of the array G and during readout of the array G to obtain the comfort noise samples. The software routine 126 may be operational to scale the comfort noise samples based on a scale factor signal (e.g., SF). A signal (e.g., SNS) may convey the scaled noise signals. The software routine 128 may be operational to generate the scale factor signal SF based on the parameters QP and/or BITRATE. The software routine 130 may add the scaled noise signals SNS to the decompressed signal M to generate the decompressed comfort signal N. In one embodiment, the software routine 120 may generate the noise samples with a final probability distribution and final range based on the received parameters, such AP and/or BITRATE. Therefore, the software routine 126 may either provide a unity scaling or be eliminated.

To keep a storage size of the noise samples low, one or both of the following two techniques may be used. First, the random noise samples may be clipped to a small range by the optional software routine 122 so that each noise sample may be represented by only a few bits. The low amplitude range of the noise samples is generally desired from a visual quality point of view since adding very large noise samples may cause noticeable distortion to the picture. An initialization software routine 132 may be used to generate an initial sequence of addresses in the signal ADD to load the noise samples into the memory circuit 104.

In a second technique, the K ransom noise samples may be reused repeatedly. For example, let R1, R2, . . . , Rp be P distinct integers in a range of 0 to K-1. The distinct integers R1 through Rp may be used as offsets from a baseline address of the noise array G as accessed through the signal ADD. Let the blocks in a decoded picture be ordered as I(1), I(2), I(3). For the blocks I(1), I(1+P) , I(1+2P) , I(1+3P), . . . , the noise samples starting from G[R1] may be used, for the blocks I(2), I(2+P), I(2+2P), I(2+3P), . . . , the noise samples starting from G [R2] may be used, and so on.

In some system implementations, memory access may be more efficient if data stored in the array G is word-aligned, where a "word" generally comprises W consecutive bytes. In such systems, the P offsets may be generated to be apart from each other by integral multiples of W bytes.

To keep the computational complexity low, the following techniques may be used to generate the P random offsets. Let P=2^T, where T is a positive integer. First, a random number generator (e.g., RNG_BLOCK) software routine 134 may be used to generate a uniform random number S in a range from 0 to 2^T−1. Generation of the random number S may be easily done, for example, by a linear congruential random number generator implementing equations 1 and 2 as follows:

$$S = (\alpha * S + \beta) \% 2^T \quad \text{Eq.(1)}$$

$$R = S * W \quad \text{Eq.(2)}$$

where α and β may be predetermined positive integers and, in many cases, W is generally an integral power of two. Therefore, the operation of modulus (%) 2^T may be similar to taking a least significant T bits of an integer. Furthermore, the product of S times W may be implemented as a left shift operation to S. To further reduce the computation complexity, the random offsets R1, R2, R3, . . . , Rp may be pre-generated and stored in the memory circuit 104. Furthermore, the lookup table 114 may be circularly accessed to find an offset for each block in a decoded picture.

Figure 5:
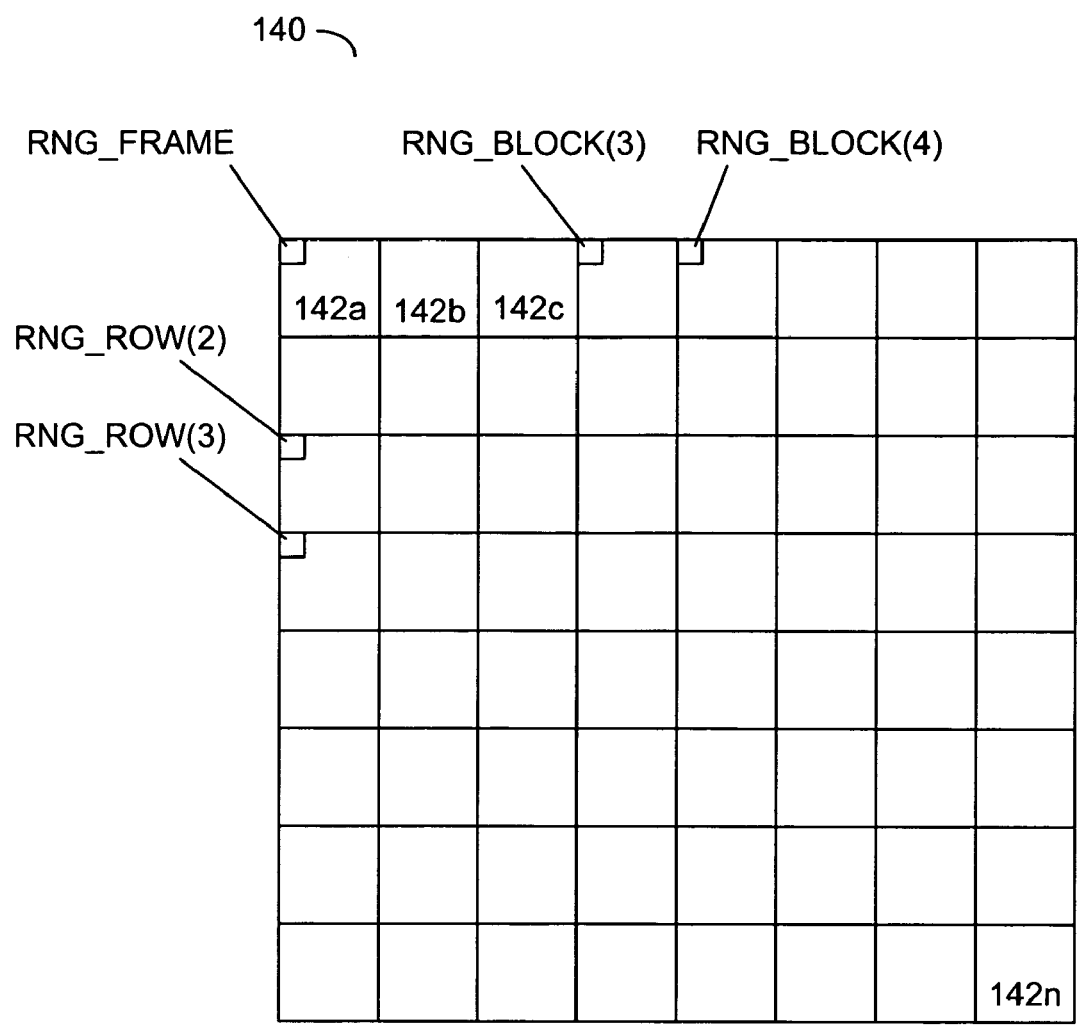
FIG. 5 is a diagram of an example picture having multiple blocks.

Referring to FIG. 5, a diagram of an example picture 140 having multiple blocks 142 (e.g., 142a-142n) is shown. To make the method of the present invention effective in reducing coding artifacts and to avoid introducing new artifacts, the following techniques may be used. To avoid visible temporal noise patterns, the offsets for the first blocks 142 in consecutive frames 140 should have some randomness. The frame level randomness may be achieved by continuously numbering the blocks 142 across consecutive frames 140 and defining the number of offsets P such that a number of blocks 142 in a decoded picture is not an integral multiple of P. In another approach, a random number generator (e.g., RNG_FRAME) software routine 136 (FIG. 4) may be implemented to generate the offsets for the first blocks 142 in consecutive frames 140.

To avoid visible spatial noise patterns, the offsets for the first blocks 142 in consecutive block rows (or columns) should have some randomness. Row randomness may be achieved by defining the number of offsets P such that the number of blocks in a row (or column) is not an integral multiple of P. In another approach, a random number generator (e.g., RNG_ROW) software routine 138 (FIG. 4) may be implemented to generate the offsets for the first blocks 142 in consecutive rows.

If the three random number generators RNG_BLOCK 134, RNG_ROW 138 and RNG_FRAME 136 are all used, (i) RNG_BLOCK 134 may be implemented to have less computational complexity than RNG_ROW 138 and (ii) RNG_ROW 138 may be implemented to have less computational complexity than RNG_FRAME 136. For example, if all of the three random number generators 134, 136 and 138 are implemented as linear congruential random number generators, then the multiplicative factor in RNG_BLOCK 134 may be one to avoid the multiplication.

For robustness in various situations, the level of added noise (e.g., σ in the Gaussian distribution and A in the triangular distribution) may be made adaptive to (i) the bit rate of the compressed video, or (ii) to the average quantization level across a number of frames, or (iii) to the noise level in the original video source. Noise sample level adaptation may be achieved by weighting the noise array G using the scaling routing 126 accordingly before adding the noise samples to a decoded picture.

Referring to FIG. 4, the averaging software process 128 may be used to generate the scale factor signal SF used to weight the noise samples. The averaging software process 128 may calculate the signal SF based on an average of quantization parameters used in compressing the video pictures. A variable (e.g., running_avg_qp) may be defined as a running average of a quantizer variable (e.g., quantizer_scale) over a number of frames of pictures. An example pseudo code for computing the variable running_avg_qp over I and P frames may be given as follows:

Initialization:
running_avg_qp=0;

Update:

```
if ( picture_coding_type == I or P for the current frame)
{
    avg_q_code = MB-level average of quantizer_scale_code of the
        current frame;
    avg_qp = map (avg_q_code) ;
    if (running_avg_qp == 0)
        running_avg_qp = avg_qp; //for quick start calculation
    else
        running_avg_qp = (running_avg_qp * 15 + avg_qp + 8) / 16;
}
```

In calculating the variable avg_q_code above, if the quantizer_scale_code of a macroblock is not present in the bitstream, avg_q_code may be set to the quantizer_scale_code of the macroblock that has the largest macroblock address less than that of the current macroblock and whose quantizer_scale_code is present in the bitstream. The mapping from avg_q_code to avg_qp may be the same as a mapping of quantizer_scale_code to quantizer_scale, generally illustrated in FIG. 6. Note that in the calculation of avg_qp, an average of quantizer_scale_code over all the macroblocks in a frame may be first computed. The avg_qp may then be mapped to quantizer_scale. Another method is to map quantizer_scale_code to quantizer_scale for each macroblock first and then average the mappings second. The two above methods give about the same results.

Figure 7:
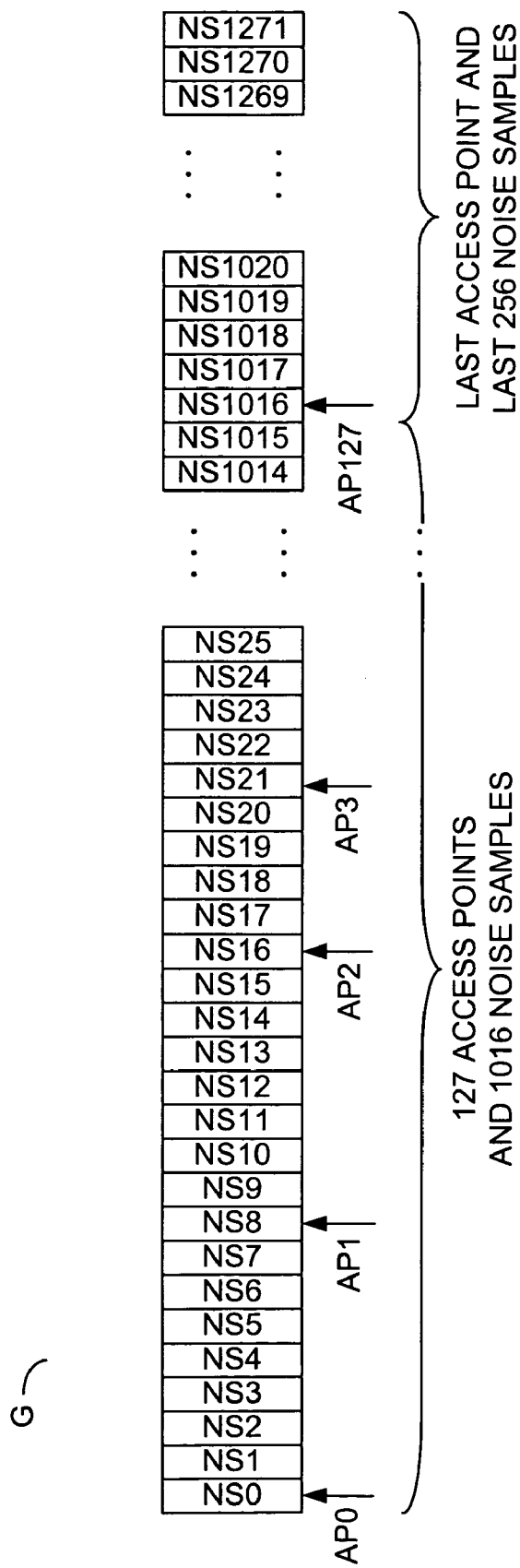
FIG. 7 is a block diagram illustrating noise samples in a linear array.
Figure 8:
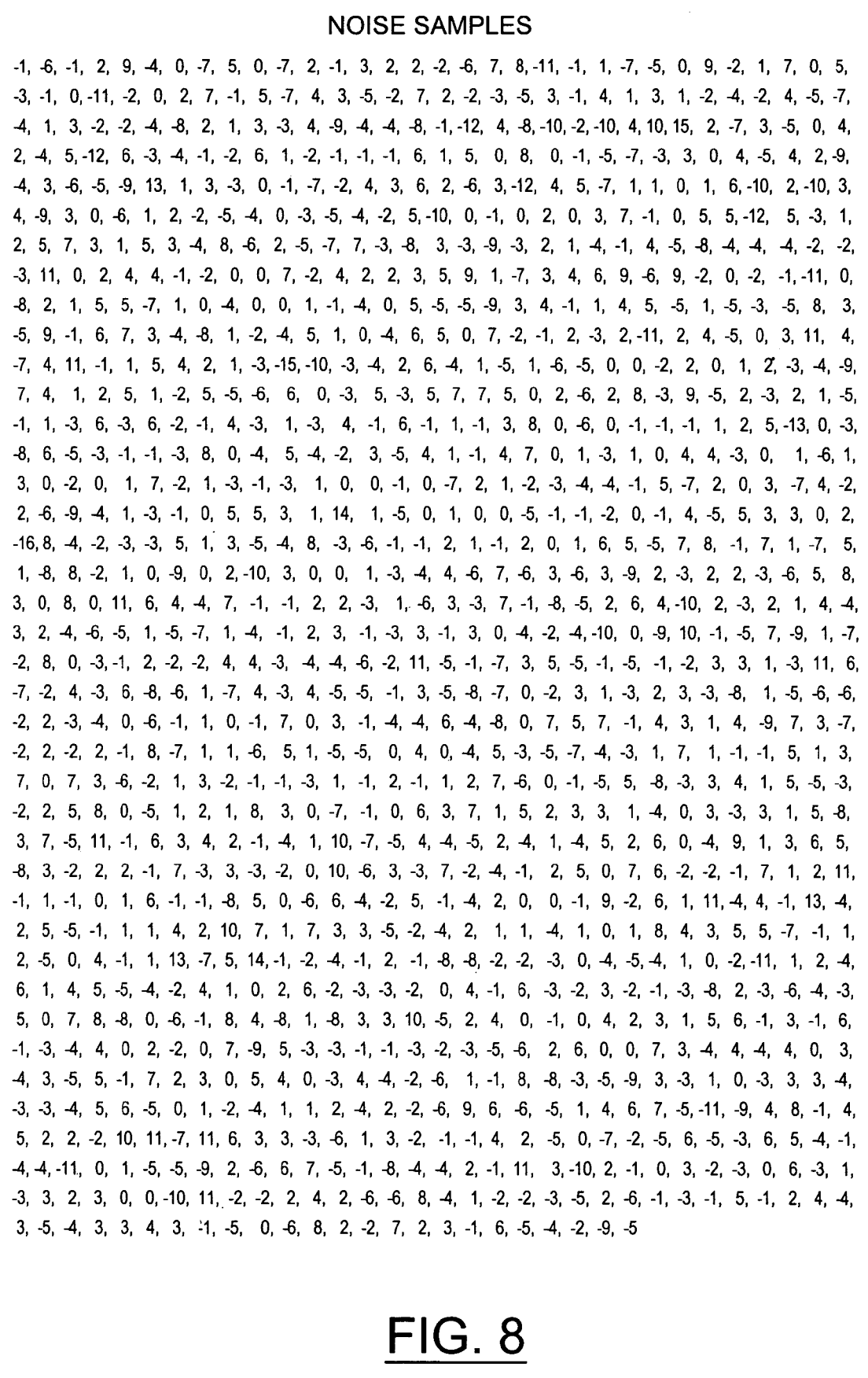

Referring to FIG. 7, a block diagram illustrating noise samples in the array G is shown. The array G may be filled with a sequence of multiple (e.g., 1272) pre-generated Gaussian random samples (e.g., NS0, NS1, NS2, . . . , NS1271). The noise samples may be Gaussian distributed with a zero mean and a standard deviation σ of 4.6. Each noise sample may be rounded to a nearest integer and clipped to an amplitude range of −128 to +127 so that each sample may be stored in a byte of memory. Each noise sample may also be denoted as G[ADD], where the signal ADD may have integer values of 0 to 1271. An example set of noise samples is generally shown in FIG. 8.

For efficient memory access, the random noise array G may be accessed in an 8-byte aligned manner. Therefore, if a block of noise samples are fetched from G, the first noise sample in the fetched block may have an offset or access point of 8*C, where C is an non-negative integer and a first sample in G has a zero offset (e.g., C=0) from a baseline address of the array G. For example, a first block of noise samples may be access starting at a first access point (e.g., AP0), as shown in FIG. 7. A second block of noise samples may be access starting at a second access point (e.g., AP1), and so on. In one embodiment, the alignment of the access points may vary across an address space of the lookup table 114. For example, the first three access points AP0-AP2 are generally shown aligned on the 8-byte boundaries. However, the fourth access point (e.g., AP3) is illustrated away from an 8-byte boundary.

A 16×16 luminance block will generally utilize 256 noise samples starting from each access point. In one embodiment, a total of 128 such 8-byte aligned access points may be implemented. Other numbers of access points may be implemented to meet a design criteria of a particular application.

Referring again to FIG. 4, for each macroblock I, an 8-byte aligned random offset may be generated by the software process 124. The software process 126 may scale the 256 noise samples starting from the access point, where the scaling factor SF depends on the value of running_avg_qp and the frame size. The software process 130 may then add the scaled samples to the macroblock I. An example pseudo code for the comfort noise addition may be given as follows:

```
// Initialization,          performed only once at the start of decoding
offset_frame = 0;            // frame level randomness
offset_mbrow = 0;            // macroblock-row level randomness
offset_mb = 0;               // macroblock level randomness
// Addition of random noise samples to a decoded picture
for each frame in the sequence
{
    offset_frame = (13*offset_frame+53)%128;
    offset_mbrow = offset_frame;
    for each row of macroblocks in the current frame
    {
        offset_mbrow = (113*offset_mbrow+37)%128;
        offset_mb = offset_mbrow;
        for each macroblock in the current macroblock row
        {
            for (n=0; n<16; n++)
            {
                for (m=0; m<16; m++)
                {
                    scaled_noise = (running_avg_qp *
                        G[offset_mb*8+n*16+m]
                        + 2^(s−1) ) >> s;
                    I[n][m] += scaled_noise;
                    I[n][m] = max(0, min(255, I[n][m] ) );
                }
            }
            offset_mb = (offset_mb+107)%128;
        }
    }
}
```

The variable offset_mb may be a random number uniformly distributed over a range of 0 to 127. The 256 noise samples in array G, starting from G[offset_mb*8] may be scaled and added to the current macroblock I. Since the random number offset_mb may be generated by a simple linear congruential random number generator (LCRNG), the random number offset_mb generally has a period of 128. To avoid possible spatial noise patterns, the offsets for the first macroblocks in consecutive macroblock rows may have some randomness. Inter-row randomness is generally achieved by the second random number offset_mbrow, which may also be generated by a LCRNG. To avoid possible temporal noise patterns, the offsets for the first macroblocks in consecutive frames may have some randomness. Inter-frame randomness is generally achieved by the third random number offset_frame, which may also be generated by a LCRNG. Note that while the LCRNGs for offset_frame and offset_mbrow utilize multiplications, the LCRNG for offset_mb may not. The variable s may be adapted to the picture size and/or noise levels. For example, the variable s may be set to 7 for full D1 resolution sequences or higher (code_picture_width>=704), and may be set to 6 for sequences of half D1 resolution and lower. The scaling of array G may be performed once per picture (e.g., at the start of a frame) since the scaling factor signal SF depends only on frame-level parameters.

To avoid the memory constraints to store array G in the memory circuit 104, a triangle-distribution random noise sample may be generated for each pixel. An example pseudo code for a simple example of triangle random number generator may be given as follows:

```
Initialization:             // initialized only once at the start
                               of decoding
    randnum = 0;
Update:                     // for each pixel
    randnum = (211* randnum + 1663) % 64;
    g1 = randnum >> 3;      // a uniform random number in
                               [0,7]
    g2 = randnum & 0x07;    // a uniform random number in
                               [0,7]
    g = g1 + g2 − 7;        // a triangle random number in
                               [−7,+7]
```

The generated random number g has a triangle distribution in [−7, +7] with peak probability 1/7 at g=0. Each sample of g may be weighted in the same way as the Gaussian-distribution noise samples and added to a pixel afterwards. Note that any other method may be used to generate the random numbers g1 and g2 (both uniform in [0,7]). Based on experiments, the Gaussian and the triangular distributions have approximately the same visual performance.

The present invention is generally based on an observation that coding artifacts all have certain patterns and breaking the patterns may effectively make the coding artifacts less noticeable to human visual system. By adding low-level random noise, the system 100 effectively reduces all the coding artifacts and yet does not introduce objectionable new artifacts.

The present invention is generally effective in reducing all types of coding artifacts and does not introduce new objectionable artifacts. The system 100 may have a very low computational and storage complexity to implement. Only a small amount of noise samples and minimum computation may be utilized since the noise samples may be repeatedly used in a regular way. The system 100 may implement word-aligned memory access. The present invention is generally robust in adaptations to various bit rates, quantization levels, and quality of the original video source. The random noise samples and the random offsets to access the noise samples may also be obtained from other sources which have certain randomness, for example, a coded video bitstream.

The present invention may also be applied to the other scenarios such as still picture compression (e.g., digital cameras with JPEG compression) and video coding with noise modeling. In encoding, video may be pre-processed to remove noise and then coded. The removed noise may be modeled and the model parameters transmitted. In decoding, noise may be added back to the decoded video based on the noise model. For example, film grain may be modeled and then transmitted in Supplemental Enhancement Information (SEI) messages implementation in the H.264 standard.

Inline generation of random noise (e.g., triangular noise) with random seeds at picture level and block/macroblock row level may also be implemented within the present invention. Randomizing a limited amount of noise (especially with the low complexity word-aligned random offset method) may also be implemented. Furthermore, a very simple pseudo random noise generator in pseudo random fashion (especially with linear congruential random number generators) on a row of macroblocks (or row of blocks/super-macroblocks) and picture (and/or field) levels may avoid easily noticeable patterns with very low complexity.

The functions performed by the diagram of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method of processing a reconstructed picture, comprising the steps of:
   (A) generating said reconstructed picture by decoding compressed data in a video bitstream with a decoder circuit;
   (B) estimating a magnitude of a plurality of coding artifacts in said reconstructed picture based upon said compressed data, said coding artifacts being created by a coding process used to generate said compressed data;
   (C) generating a plurality of noise samples with a probability distribution over a range using a processor circuit, said probability distribution determined by said magnitude of said coding artifacts; and
   (D) generating an output picture by adding said noise samples to said reconstructed picture.

2. The method according to claim 1, wherein step (B) comprises the sub-steps of:
   generating said noise samples with a predetermined probability distribution; and
   scaling said noise samples based upon said magnitude.

3. The method according to claim 2, wherein said scaling comprises a unity scaling.

4. The method according to claim 2, wherein said predetermined probability distribution comprises a Gaussian distribution.

5. The method according to claim 2, wherein said predetermined probability distribution comprises a triangular distribution.

6. The method according to claim 1, wherein said magnitude is determined by a plurality of quantization parameters of said compressed data.

7. The method according to claim 6, wherein said magnitude is determined by a running average of said quantization parameters over a plurality of frames proximate said reconstructed picture.

8. The method according to claim 1, wherein said magnitude is determined by a bit rate of said compressed data.

9. The method according to claim 8, wherein said magnitude decreases as said bit rate increases.

10. The method according to claim 1, further comprising the steps of:
    generating a first random number that identifies a first starting point among said noise samples for addition to said reconstructed picture at one of (i) a frame level, (ii) a field level and (iii) a picture level.

11. A system comprising:
    a lookup table configured to store a plurality of noise samples;
    a decoder circuit configured to (i) generate a reconstructed picture by decoding compressed data in a video bitstream and (ii) estimate a magnitude of a plurality of coding artifacts in said reconstructed picture based upon said compressed data, said coding artifacts being created by a coding process used to generate said compressed data; and
    a processor circuit configured to (i) generate said noise samples with a probability distribution over a range, said probability distribution determined by said magnitude of said coding artifacts and (ii) generate an output picture by adding said noise samples to said reconstructed picture.

12. The system according to claim 11, wherein said processor circuit is further configured to (i) write said noise samples with a predetermined probability distribution into said lookup table and (ii) scale said noise samples read from said lookup table based upon said magnitude.

13. A method of processing a reconstructed picture, comprising the steps of:
    (A) generating said reconstructed picture by decoding compressed data in a video bitstream with a decoder circuit;
    (B) generating an array having a plurality of noise samples with a processor circuit;
    (C) generating a plurality of random offsets from a base address of said array, each of said random offsets defining a subset of said noise samples; and
    (D) generating an output picture by adding said subsets to a plurality of blocks in said reconstructed picture.

14. The method according to claim 13, wherein (i) said compressed data defines a plurality of said reconstructed pictures and (ii) said random offsets are generated such that said blocks spatially aligned across consecutive frames of said reconstructed pictures use different subsets of said subsets to deter visible temporal noise patterns.

15. The method according to claim 13, wherein said random offsets are generated such that said blocks vertically aligned across consecutive block rows of said reconstructed picture use different subsets of said subsets to deter visible spatial noise patterns.

16. The method according to claim 13, wherein said random offsets are generated such that said blocks horizontally aligned across consecutive block columns of said reconstructed picture use different subsets of said subsets to deter visible spatial noise patterns.

17. The method according to claim 13, wherein said random offsets are generated such that consecutive blocks of said blocks in said reconstructed picture use different subsets of said subsets to deter visible spatial noise patterns.

18. The method according to claim 13, wherein generating said array is performed only once for a plurality of said reconstructed pictures.

19. The method according to claim 13, wherein each of said subsets is added to a plurality of said blocks within said reconstructed picture.

20. The method according to claim 13, where (i) a first number of said noise samples in each of said subsets and (ii) a second number of luminance samples in each of said blocks are not an integer multiple of each other.

21. The method according to claim 13, where (i) a first number of said noise samples in each of said subsets and (ii) a second number of luminance samples in each of a plurality of block rows of said reconstructed picture are not an integer multiple of each other.

22. The method according to claim 13, where (i) a first number of said noise samples in each of said subsets and (ii) a second number of luminance samples in said reconstructed picture are not an integer multiple of each other.

23. The method according to claim 1, further comprising the step of:
generating a random number that identifies a starting point among said noise samples for addition to one of a plurality of rows of said reconstructed picture.

24. The method according to claim 1, further comprising the step of:
generating a random number that identifies a starting point among said noise samples for addition to one of a plurality of macroblocks of said reconstructed picture.

25. The system according to claim 11, wherein said processor circuit is further configured to (i) generate a first random number that identifies a first starting point among said noise samples for addition to said reconstructed picture at one of (a) a frame level, (b) a field level and (c) a picture level and (ii) generate a second random number that identifies a second starting point among said noise samples for addition to one of a plurality of rows of said reconstructed picture.

26. The method according to claim 13, further comprising the steps of:
generating a first random number that identifies a first starting point among said noise samples for addition to said reconstructed picture at one of (i) a frame level, (ii) a field level and (iii) a picture level; and
generating a second random number that identifies a second starting point among said noise samples for addition to one of a plurality of macroblocks of said reconstructed picture.

* * * * *